(12) United States Patent
Lee et al.

(10) Patent No.: US 7,164,626 B2
(45) Date of Patent: Jan. 16, 2007

(54) OPTICAL PICKUP USING A WEDGE TYPE BEAM SPLITTER

(75) Inventors: Dong-ryeol Lee, Seoul (KR); Pyong-yong Seong, Seoul (KR); Kun-soo Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 566 days.

(21) Appl. No.: 10/751,114

(22) Filed: Jan. 5, 2004

(65) Prior Publication Data

US 2005/0052968 A1 Mar. 10, 2005

(30) Foreign Application Priority Data

Jan. 4, 2003 (KR) ................. 10-2003-0000438

(51) Int. Cl.
*G11B 7/00* (2006.01)
(52) U.S. Cl. ................. 369/44.23; 369/112.01
(58) Field of Classification Search ............ 369/44.23, 369/44.24, 112.01, 112.1, 44.37
See application file for complete search history.

(56) References Cited

U.S. PATENT DOCUMENTS 7,079,468 B1 * 7/2006 Worthington et al. ......... 369/94

FOREIGN PATENT DOCUMENTS

| JP | 2001-43553 | 2/2001 |
|---|---|---|
| JP | 2001-167467 | 6/2001 |
| JP | 2002-237082 | 8/2002 |
| KR | 1999-83967 | 12/1999 |

OTHER PUBLICATIONS

Notice of Office Action issued by Korean Patent Office, on Oct. 27, 2004, for a corresponding Korean Patent Appliction 2003-438.

* cited by examiner

*Primary Examiner*—Nabil Hindi
(74) *Attorney, Agent, or Firm*—Staas & Halsey LLP

(57) ABSTRACT

A compatible type optical pickup using a wedge type beam splitter that can record and/or reproduce information on/from optical recording media having different formats. The compatible type optical pickup includes: a first light source that generates and emits a first light beam of a predetermined wavelength; a second light source that generates and emits a second light beam having a different wavelength from that of the first light beam; a wedge type beam splitter disposed in an optical path between the first and second light sources, which changes the traveling paths of the first and second light beams to allow the first and second light beams to travel along the same optical path and minimizes aberrations; a main beam splitter disposed in an optical path between the wedge type beam splitter and an optical recording medium, which changes the traveling paths of incident light beams; an objective lens that focuses the first and second light beams entered via the main beam splitter onto the optical recording medium; and a main photodetector that receives the first and second light beams reflected from the optical recording medium detects an information signal and an error signal.

20 Claims, 3 Drawing Sheets

OPTICAL PICKUP USING A WEDGE TYPE BEAM SPLITTER

CROSS-REFERENCE TO RELATED APPLICATIONS

This application claims the priority of Korean Patent Application No. 2003-438, filed Jan. 4, 2003, in the Korean Intellectual Property Office, the disclosure of which is incorporated herein by reference in its entirety.

BACKGROUND OF THE INVENTION

1. Field of the Invention

The present invention relates to a compatible type optical pickup designed to record and/or reproduce information on and/or from optical recording media having different formats, and more particularly, to a compatible type optical pickup using a wedge type beam splitter.

2. Description of the Related Art

Generally, compatible type optical pickups are designed to record/reproduce information on/from optical recording media having different formats such as DVD and CD.

Referring to FIG. 1, a conventional compatible type optical pickup includes a light source module 11 that emits a beam having a predetermined wavelength and receives a beam reflected from an optical recording medium D, a second light source 21 that emits a beam having a different wavelength from that of the beam emitted by the light source module 11, a beam shape compensating prism 30 that changes the traveling path of an incident beam and compensates for the shape of the incident beam, a beam splitter 41 that changes the traveling path of an incident beam, an objective lens 43 that focuses an incident beam to form a beam spot on the optical recording medium D, and a main photodetector 49 that receives the beams reflected from the optical recording medium D and detects an information signal and error signal.

The light source module 11 integrates a first light source (not shown), a photodetector (not shown) disposed adjacent to the first light source, and a holographic optical element 12 into a single unit. A beam emitted from the first light source is directed through the holographic optical element 12 and travels toward the optical recording medium D. The beam reflected from the optical recording medium D is diffracted by the holographic optical element 12 and focused onto the photodetector.

A first coupling lens 13 that converges a divergent beam incident from the first light source and a first grating 15 that diffracts the beam into $0^{th}$, $\pm 1^{st}$, $\pm 2^{nd}$, etc. order beams are positioned in an optical path between the light source module 11 and the beam splitter 41. Here, most of the light emitted from the first light source and traveling toward the beam splitter 41 is transmitted through the beam splitter 41 and travels toward the optical recording medium D while the remaining light is reflected toward a first monitor photodetector 17. The optical power of the first light source can be checked with the amount of light received onto the first monitor photodetector 17, thereby making it possible to control the optical power of the first light source.

The second light source 21 is constituted by an edge emitting type semiconductor laser that emits light having a shorter wavelength than that of the first light source. According to the characteristics of a semiconductor laser, the second light source 21 emits a beam of an elliptic cross section. The beam shape-compensating prism 30 compensates for the shape of the incident elliptic beam in such a way as to form a circular spot on the optical recording medium D. By compensating for the shape of the beam in this way, information can be recorded employing the beam emitted by the second light source 21.

A second coupling lens 23 that converges the incident divergent beam and a second grating 25 that diffracts the incident beam are disposed in the optical path between the second light source 21 and the beam shape compensating prism 30.

The beam shape compensating prism 30 has an entrance plane 31 onto which the beam from the second light source 21 is incident, a reflection plane 32 from which the incident beam is reflected, and an exit/reflection plane 33 where the beam reflected from the reflection plane 32 is directed while the beam incident from the optical recording medium D is reflected toward the main photodetector 49. Thus, the exit beam that is transmitted through the exit/reflection plane 33 is reflected from the beam splitter 41 and travels toward the optical recording medium D.

A second monitor photodetector 27 is disposed opposite the entrance plane 31. The second monitor photodetector 27 receives some of the light that is emitted from the second light source 21 and reflected from the entrance plane 31 and detects the optical power of the second light source 21.

A collimating lens 45 that collimates an incident beam and a sensor lens 47 that adjusts the size of the incident beam and changes a focus position are placed on the optical path between the exit/reflection plane 33 and the main photodetector 49.

The compatible type optical pickup configured as above can record and/or reproduce information to and/or from optical recording media having different formats. However, the above optical pickup configuration has a problem in that the manufacturing cost is high due to the large number of optical elements, including the beam shape-compensating prism. Further, the complicated structure of the optical pickup increases the size as well as the number of assembling steps. Still another problem is that the aberration characteristics of an optical system become sensitive due to the use of a beam shape-compensating prism.

SUMMARY OF THE INVENTION

The present invention provides a compatible type optical pickup designed with a simple structure to record and reproduce information and to improve optical aberration characteristics by excluding a beam shape-compensating prism.

According to an aspect of the present invention, there is provided a compatible type optical pickup including: a first light source that generates and emits a first light beam of a predetermined wavelength; a second light source that generates and emits a second light beam having a different wavelength from that of the first light beam; a wedge type beam splitter disposed in an optical path between the first and second light sources, which changes the traveling paths of the first and second light beams to allow the first and second light beams to travel along the same optical path and minimizes aberrations; a main beam splitter disposed in an optical path between the wedge type beam splitter and an optical recording medium, which changes the traveling paths of incident light beams; an objective lens that focuses the first and second light beams entered via the main beam splitter onto the optical recording medium; and a main photodetector that receives the first and second light beams reflected from the optical recording medium detects an information signal and an error signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
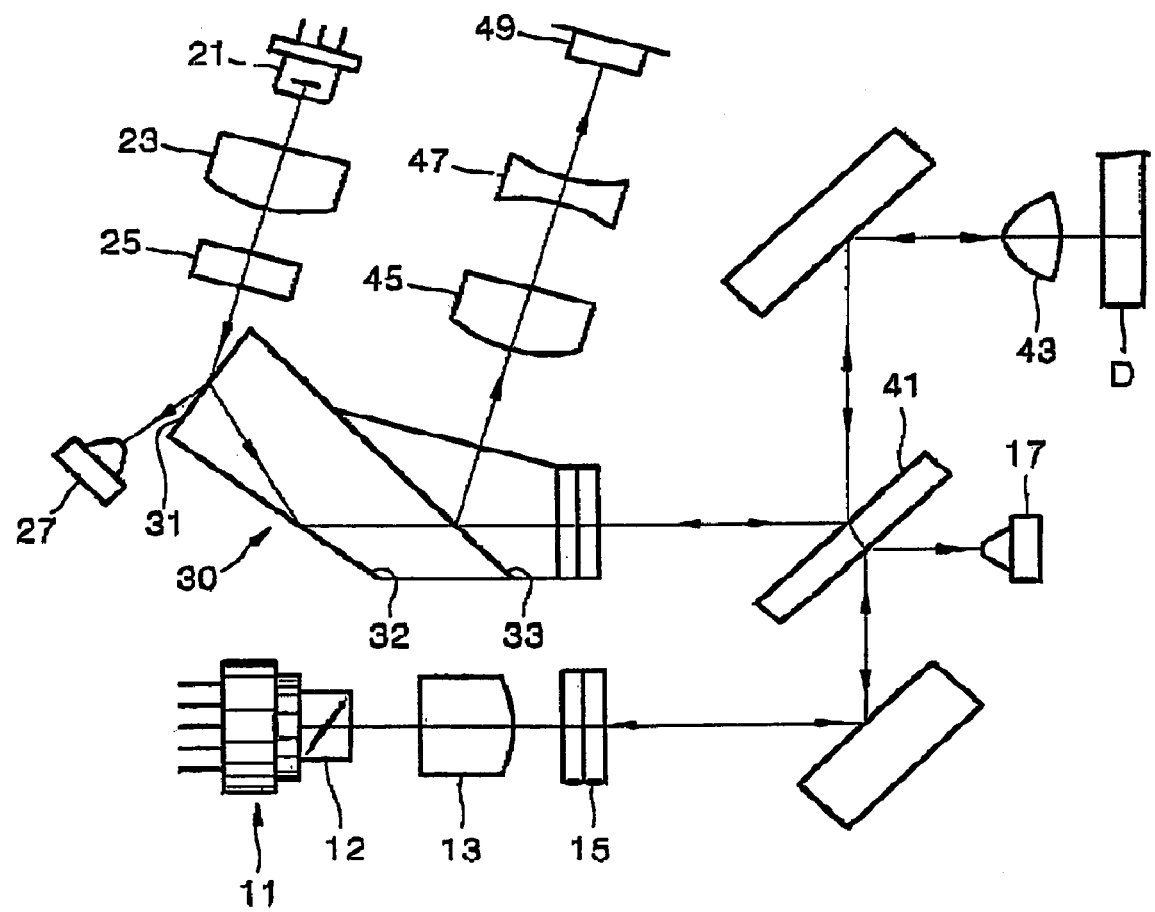
FIG. 1 shows the optical configuration of a conventional compatible type optical pickup.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
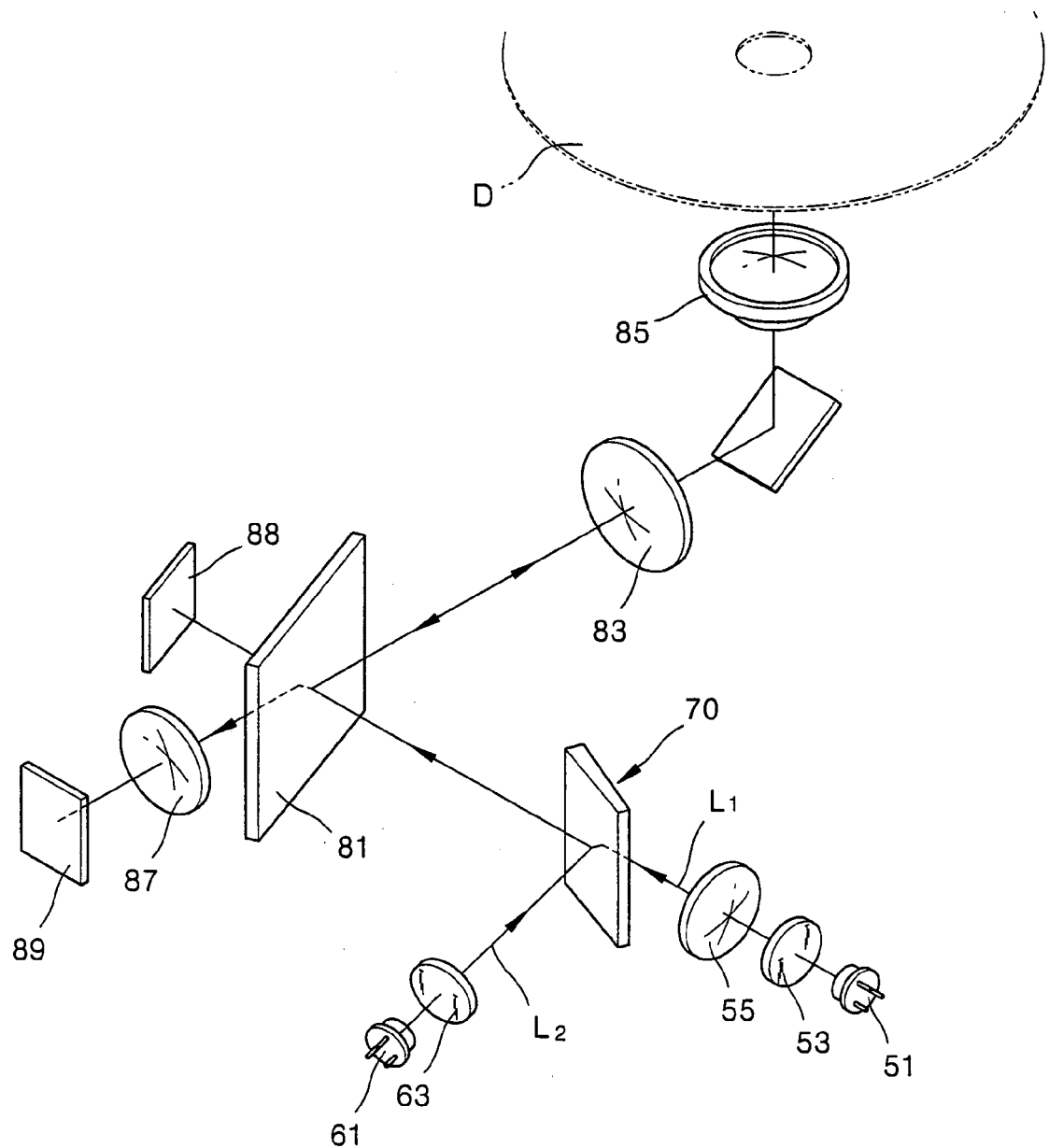
FIG. 2 shows the optical configuration of a compatible type optical pickup according to an embodiment of the present invention.

Referring to FIG. 2, a compatible type optical pickup according to an embodiment of the present invention includes first and second light sources 51 and 61, a wedge type beam splitter 70 and a main beam splitter 81 that changes the traveling paths of incident light beams, an objective lens 85 that focuses the incident light onto an optical recording medium D, and a main photodetector 89 that receives light beams reflected from the optical recording medium D and detects an information signal and error signals.

The first light source 51 generates and emits a first light beam $L_1$ of a predetermined wavelength. For example, the first light source 51 is used when adopting a compact disc (CD) as the optical recording medium D. In this case, the wavelength of the first light beam $L_1$ is about 780 nm.

The second light source 61 generates and emits a second light beam $L_2$ having a different wavelength from that of the first light beam $L_1$. For example, the second light source 61 is used when adopting a digital versatile disc (DVD) as the optical recording medium D. In this case, the wavelength of the second light beam $L_2$ is about 650 nm.

The first and second light sources 51 and 61 are disposed in close proximity to the wedge type beam splitter 70. Thus, since a driving IC (not shown) for driving the first and second light sources 51 and 61 can be placed near both first and second light sources 51 and 61, it is possible to reduce noise generated between either the first or second light sources 51 and 61 and the driving IC.

In this embodiment, the compatible type optical pickup may further include a coupling lens 55 that converges the first light beam $L_1$ emitted by the first light source 51. The coupling lens 55 is disposed in the optical path between the first light source 51 and the wedge type beam splitter 70. The coupling lens 55 is an optical element designed to control the occurrence of offset of the first light beam $L_1$ and optical efficiency. The coupling lens 55 may be implemented with a spherical lens, an aspheric lens or a holographic optical element having positive refractive power. The first light beam $L_1$ transmitted through the coupling lens 55 and through the wedge type beam splitter 70 becomes an almost parallel beam so that optical aberration is minimized.

The wedge type beam splitter 70 with a flat plate structure is placed along an optical path between the first and second light sources 51 and 61. The wedge type beam splitter 70 changes the traveling paths of the first and second incident light beams $L_1$ and $L_2$ so that the light beams $L_1$ and $L_2$ travel along the same optical path. In addition, the wedge type beam splitter 70 is configured to minimize optical aberrations such as astigmatism and coma.

Figure 3:
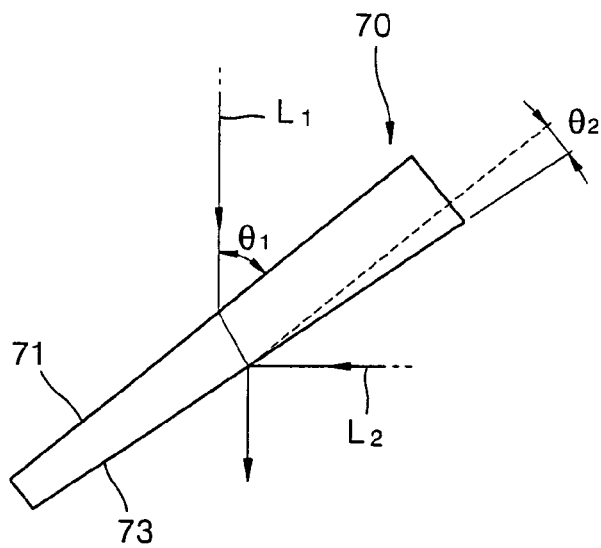
FIG. 3 shows the wedge type beam splitter shown in FIG. 2.

Referring to FIG. 3, the wedge type beam splitter 70 has an entrance plane 71 inclined at the angle of $\theta_1$ with respect to an optical axis of the first light beam $L_1$ and an exit/reflection plane 73 tilted at the angle of $\theta_2$ with respect to the entrance plane 71. The entrance plane 71 is placed opposite the first light source 51 in order to transmit the first light beam $L_1$. The exit/reflection plane 73 transmits the incident first light beam $L_1$ transmitted through the entrance plane 71 and reflects the second light beam $L_2$, thus allowing the first and second light beams $L_1$ and $L_2$ to travel along the same optical path.

Transmittance/reflection properties at different wavelengths are determined by coatings on the entrance plane 71 and the exit/reflection plane 73. The wedge type beam splitter 70 having a flat plate structure shown above can satisfy coating specifications more easily than cubic type beam splitters. Since coatings on beam splitters are widely known in the art, a detailed description will be omitted.

Here, the wedge angle of the wedge type beam splitter 70, which is the inclination angle $\theta_2$ of the exit/reflection plane 73, is experimentally determined within the range that will minimize optical aberrations.

Figure 4:
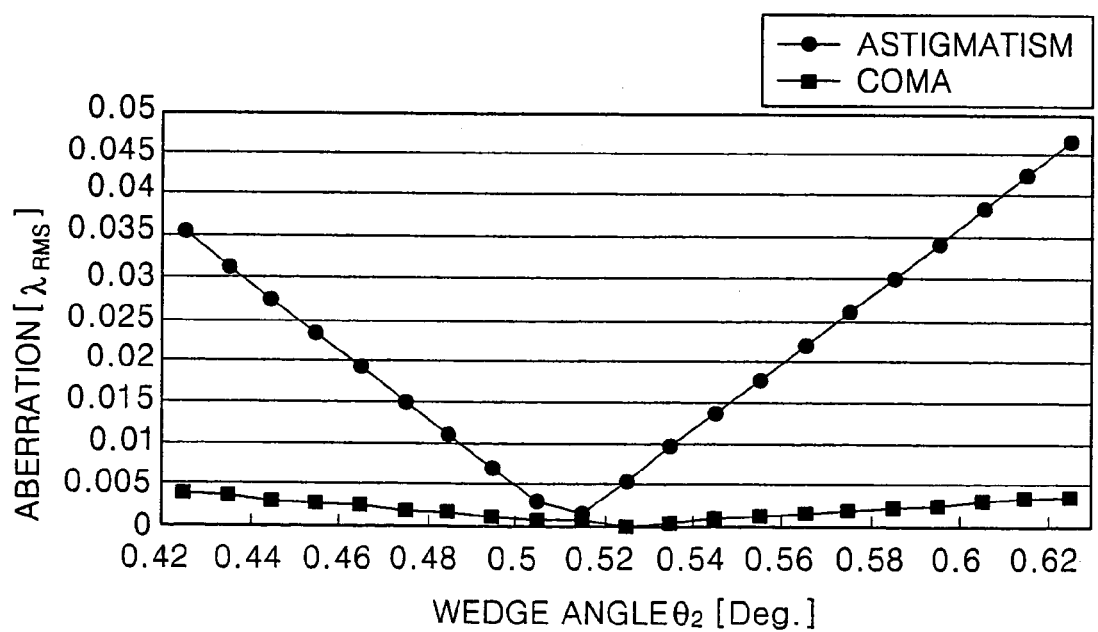
FIG. 4 is a graph showing astigmatism and coma characteristics with respect to a change in the wedge angle of a wedge type beam splitter.

FIG. 4 is a graph showing astigmatism and coma characteristics with respect to a change in the wedge angle of a wedge type beam splitter. Specifically, FIG. 4 shows aberration characteristics with respect to a change in the wedge angle $\theta_2$ where the wedge type beam splitter whose thickness on the optical axis is 0.7 mm is placed so that the angle $\theta_1$ is 40 degrees.

Referring to FIG. 4, while coma aberration is kept less than 0.005 $\lambda_{RMS}$, which is negligible, despite the change in wedge angle, astigmatism aberration is sensitive to the change in wedge angle. That is, as evident in FIG. 4, astigmatism aberration is minimized to less than 0.005 $\lambda_{RMS}$ where the wedge angle $\theta_2$ is between 0.5 and 0.52 degrees.

It is preferable to keep the aberrations less than 0.035 $\lambda_{RMS}$. Taking this into consideration, it is preferable that the inclination angle $\theta_2$ with respect to the entrance plane 71 satisfy relation (1) below:

$$0.42° \leq \theta_2 \leq 0.6° \quad (1)$$

It is preferable that the wedge angle $\theta_2$ be about 0.51 degrees to minimize aberrations.

The wedge type beam splitter 70 may also have the inclination angle other than 40 degrees considering the above optical arrangement of the first and second light sources 51 and 61.

Turning to FIG. 2, the main beam splitter 81 is placed on the optical path between the wedge beam splitter 70 and the optical recording medium D to convert the traveling paths of the incident light beams. That is, the main beam splitter 81 allows the light beams incident from the first and second light sources 51 and 61 to travel toward the optical recording medium D and the light beams incident from the optical recording medium D to travel toward the main photodetector 89. That is, the first and second light beams $L_1$ and $L_2$ are reflected so that the beams $L_1$ and $L_2$ travel toward the objective lens 85 while the light beams reflected from the optical recording medium D are transmitted so that the beams travel toward the main photodetector 89.

The objective lens 85 focuses the first and second light beams $L_1$ and $L_2$ entered via the main beam splitter 81 onto the optical recording medium D.

The compatible type optical pickup may further include a collimating lens 83 that collimates a divergent incident light beam into a parallel beam and is disposed in an optical path between the main beam splitter 81 and the objective lens 85.

The main photodetector 89 receives the first and second light beams $L_1$ and $L_2$ transmitted through the main beam splitter 81 and detects an information signal from the optical recording medium D as well as a focusing error signal and a tracking error signal that are necessary to drive the objective lens 85. Here, an astigmatic lens 87 is disposed in an optical path between the main beam splitter 81 and the main photodetector 89.

The astigmatic lens 87 is used to detect a focusing error signal for all types of optical recording media, e.g., both CD and DVD, by means of an astigmatic method. Since the astigmatic method is well known in the art, a detailed description thereon will be omitted. According to this invention, when recording/reproducing information using first and second light beams, this astigmatic method is used for all types of optical recording media in order to detect a focusing error signal, thus reducing the cost compared to other structures in which different methods are used for each optical recording medium in order to detect the same. The compatible type optical pickup according to this invention further includes a first grating 53 disposed in the optical path between the first light source 51 and the wedge type beam splitter 70 and a second grating 63 disposed in the optical path between the second light source 61 and the wedge type beam splitter 70. The first and second gratings 53 and 63 diffract the incident beams into $0^{th}$, $\pm 1^{st}$, $\pm 2^{nd}$ order beams that are used to detect a tracking error signal with the main photodetector 89 by a 3-beam method. The 3-beam method is well known in the art, so a detailed description thereon will be omitted.

Further, the compatible type optical pickup according to this invention may further include a monitoring photodetector 88 that receives some of the beams emitted from the first and second light sources 51 and 61 and monitors the optical power.

The monitoring photodetector 88 is placed in such a way as to receive light beams split by the main beam splitter, that is, the beams that pass through the main beam splitter 81 after having been emitted from the first and second light sources 51 and 61. Thus, it is possible to detect the optical power of the first and second light sources 51 and 61 from the amount of light received by the monitoring photodetector 88. The detected optical power information is used to control the optical power of the first and second light sources 51 and 61 through an auto power controller (not shown).

The compatible type optical pickup of this invention as configured above enables recording and/or reproduction of information while simplifying its structure by employing a wedge type beam splitter. Furthermore, the optical pickup of this invention can improve optical aberration characteristics by not adopting a beam shape-compensating prism that severely affects optical aberrations while reducing its overall volume.

Yet another advantage of this invention is that it eliminates certain components by placing first and second light sources near each other so that a driving IC driving the first and second light sources can be disposed in close proximity to both light sources. In addition, by adopting a wedge type beam splitter having a flat plate structure, this invention simplifies the coating that determines the transmissivities and reflectivities of the entrance plane and exit/reflection plane when compared to those employing a cubic type beam splitter.

This invention also simplifies circuit configuration and reduces cost by detecting a focusing error signal for all types of optical recording media by means of an astigmatic method using an astigmatic lens compared to other structures in which different methods are used for each optical recording medium in order to detect the focusing error signal.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A compatible type optical pickup comprising:
    a first light source that generates and emits a first light beam of a predetermined wavelength;
    a second light source that generates and emits a second light beam having a different wavelength from that of the first light beam;
    a wedge type beam splitter disposed in a first optical path between the first and second light sources, which changes traveling paths of the first and second light beams to allow the first and second light beams to travel along a same optical path and minimizes aberrations;
    a main beam splitter disposed in a second optical path of the first and second light sources, between the wedge type beam splitter and an optical recording medium, which changes traveling paths of incident light beams;
    an objective lens that focuses the first and second light beams entered via the main beam splitter onto the optical recording medium; and
    a main photodetector that receives the first and second light beams reflected from the optical recording medium and detects an information signal and an error signal.

2. The optical pickup of claim 1, wherein the wedge type beam splitter comprises:
    an entrance plane inclined at an angle of $\theta_1$ with respect to an optical axis of the first light beam transmitting the first light beam; and
    an exit/reflection plane inclined at an angle of $\theta_2$ with respect to the entrance plane transmitting the first light beam and reflecting the second light beam.

3. The optical pickup of claim 2, wherein the inclination angle $\theta_1$ of the entrance plane is about 40 degrees.

4. The optical pickup of claim 3, wherein the inclination angle $\theta_2$ of the exit/reflection plane satisfies the following relationship:

$$0.42° \leq \theta_2 \leq 0.6°.$$

5. The optical pickup of claim 2, wherein the inclination angle $\theta_2$ of the exit/reflection plane satisfies the following relationship:

$$0.42° \leq \theta_2 \leq 0.6°.$$

6. The optical pickup of claim 1 further comprising:
a first grating disposed in an optical path between the first light source and the wedge type beam splitter, diffracting the incident light beam; and
a second grating disposed in an optical path between the second light source and the wedge type beam splitter, diffracting an incident light beam.

7. The optical pickup of claim 1, further comprising an astigmatic lens disposed in an optical path between the main beam splitter and the main photodetector, introducing astigmatism in a light beam entering via the main beam splitter.

8. The optical pickup of claim 1, further comprising a collimating lens disposed in an optical path between the main beam splitter and the objective lens, which collimates an incident divergent light beam into a parallel beam.

9. The optical pickup of claim 1, further comprising a monitoring photodetector that receives the light beams split by the main beam splitter and monitors optical power output from the first and second light sources.

10. The optical pickup of claim 1, further comprising a coupling lens disposed in an optical path between the first light source and the wedge type beam splitter converging the light beam emitted by the first light source.

11. The optical pickup of claim 10, wherein the coupling lens is implemented with one of a spherical lens, an aspheric lens, and a holographic optical element.

12. The optical pickup of claim 1, further comprising:
a first grating disposed in an optical path between the first light source and the wedge type beam splitter to diffract the incident light beam;
a second grating disposed in an optical path between the second light source and the wedge type beam splitter to diffract the incident light beam;
an astigmatic lens disposed in an optical path between the main beam splitter and the main photodetector to cause astigmatism in a light beam entering via the main beam splitter;
a collimating lens disposed in an optical path between the main beam splitter and the objective lens, collecting and transforming an incident divergent light beam into a parallel beam;
a monitoring photodetector that receives the light beams split by the main beam splitter and monitors optical power output from the first and second light sources; and
a coupling lens disposed in an optical path between the first light source and the wedge type beam splitter, to converge the first light beam emitted from the first light source.

13. The optical pickup of claim 10, wherein the coupling lens is an optical element designed to control the occurrence of offset of the first light beam and optical efficiency.

14. The optical pickup of claim 10, wherein the first light beam transmitted through the coupling lens and the wedge type beam splitter becomes nearly parallel minimizing optical aberration.

15. The optical pickup of claim 1, wherein the wedge type beam splitter has a flat plate structure.

16. The optical pickup of claim 1, wherein the wedge type beam splitter disposed between the first and second light sources, changes traveling paths of first and second incident light beams so that the first and second incident light beams travel along a same optical path.

17. The optical pickup of claim 1, wherein the wedge type beam splitter minimizes optical aberrations including astigmatism and coma aberration.

18. The optical pickup of claim 1, wherein the wedge type beam splitter has a flat plate structure, simplifying a coating that determines transmissivities and reflectivities of an entrance plane and exit/reflection plane when compared to those employing a cubic type beam splitter.

19. The optical pickup of claim 1, wherein the first and second light sources are disposed in close proximity to the wedge type beam splitter.

20. The optical pickup of claim 1, wherein a driving IC, driving the first and second light sources is placed near both first and second light sources, reducing noise generated between either the first or second light sources and the driving IC.

* * * * *